Oct. 21, 1924.
1,512,655
E. J. VAN AMBURGH
MACHINE FOR CUTTING FABRICS
Filed Dec. 1, 1919
2 Sheets-Sheet 1
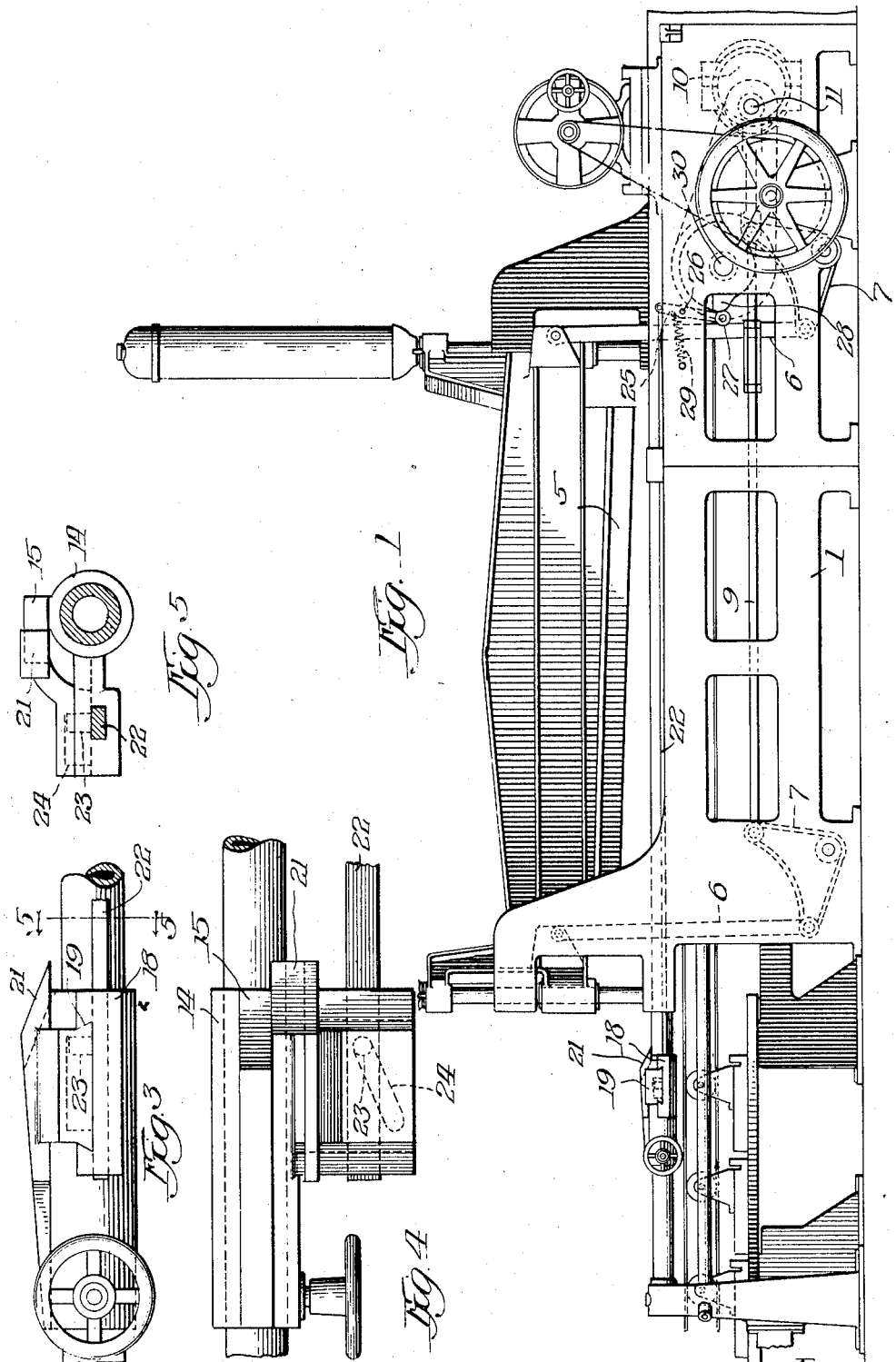
Inventor
Edward J. Van Amburgh Oct. 21, 1924.
E. J. VAN AMBURGH
1,512,655
MACHINE FOR CUTTING FABRICS
Filed Dec. 1, 1919   2 Sheets-Sheet 2
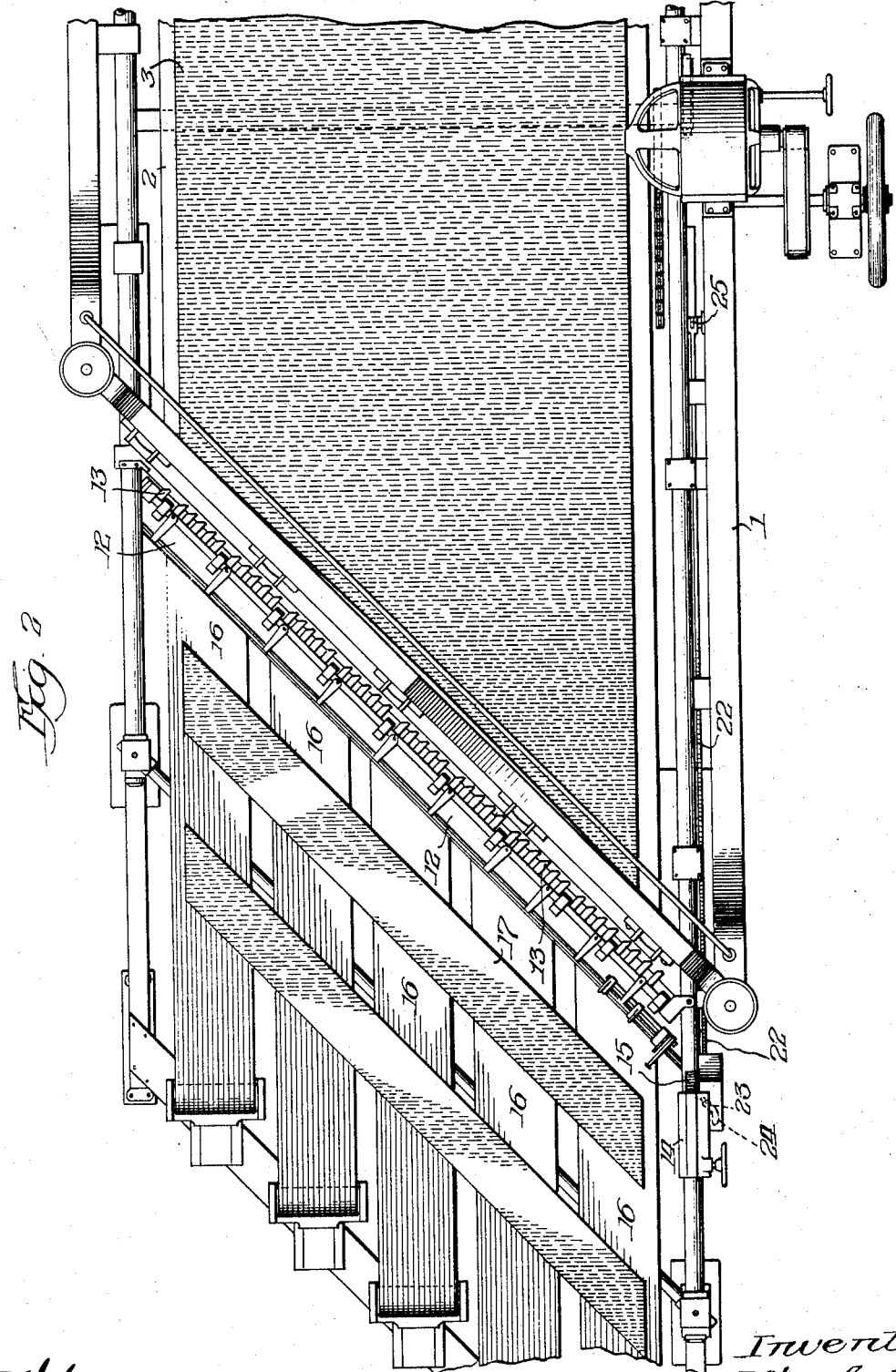
Witness:
Inventor
Edward J. Van Amburgh
By Patented Oct. 21, 1924.

1,512,655

UNITED STATES PATENT OFFICE.

EDWARD J. VAN AMBURGH, OF AKRON, OHIO, ASSIGNOR TO THE FIRESTONE TIRE AND RUBBER COMPANY, OF AKRON, OHIO, A CORPORATION OF OHIO.

MACHINE FOR CUTTING FABRICS.

Application filed December 1, 1919. Serial No. 341,648.

*To all whom it may concern:*

Be it known that I, EDWARD J. VAN AMBURGH, a citizen of the United States, residing at Akron, in the county of Summit, State of Ohio, have invented certain new and useful Improvements in Machines for Cutting Fabrics, of which the following is a specification.

This invention relates to machines for cutting strips of fabric, and especially for cutting pieces of fabric on the bias or at an angle of 45°, which fabric is used in the manufacture of tire casings. In the making of tires it is preferable to cut the strips into two widths, which are required to go under and over the bead of the tire, the under bead plies being narrower than the over bead plies. In certain circumstances and under special conditions it may be necessary to cut the wide and narrow plies on the same machine, and this invention has as its object the provision of means on the bias cutter by which wide and narrow strips may be cut alternately if desired. This construction is of advantage in small shops, and when bias cutters are employed in tandem, and one may become inoperative for any reason.

The invention is illustrated as applied to horizontal bias cutters of a well-known type, but it is obvious that it may be applied with equal facility to a vertical bias cutter or any other type which has been or may be perfected.

Furthermore, it will be understood that the invention is not restricted to machines for cutting fabric on the bias, but may be applied to other machines for cutting fabric. The showing in the drawings accompanying this application are by way of example merely and not understood to be more than an example of manners of application of the invention.

In the drawings:

Fig. 1 is a side elevation of a bias cutter of the horizontal type having my improved attachment applied thereon.

Fig. 2 is a plan view.

Fig. 3 is a side elevation of the gripper controlling cams.

Fig. 4 is a plan view of Fig. 3, and

Fig. 5 is a section on the line 5—5 of Fig. 3.

As the fabric cutter is of a type familiar on the market for a considerable period, it will not be described in detail, only being gone into sufficiently to enable the operation of my improved attachment to be understood.

The bias cutter comprises a frame work or upright 1 on which is located a table 2 over which the fabric 3 may be drawn. The front of the table is cut off at the angle desired for the cut, in this case the angle being 45°, and over the edge of the table is arranged the vertically reciprocating knife 5 adapted to be operated by links 6, connected to rockers 7 pivoted at 8 to the frame. The rockers are connected by links 9 to eccentrics 10 carried on a shaft 11.

Arranged in front of the knife is a reciprocating gripper bar 12 which carries a plurality of gripper fingers 13, which are designed to seize the end of the fabric and pull it under the knife the required distance. At the side of the machine is an adjustable carriage or slide 14 which carries a dog or cam 15 which serves to open the fingers 13 at the time the correct length of fabric has been drawn under the cutter, whereupon the knife descends and the severed strip drops on a plurality of belts 16 by which it is carried away from the machine. A strip of the severed fabric is designated by the numeral 17.

As far as has been described, the machine is similar to those in use in the art, and from this point my improved attachment for cutting alternating widths of fabric will be described.

The slide 14 is provided with an angularly projecting extension 18, the upper surface of which is provided with a dove-tail guide 19 supporting for sliding movement a bar 20 on the inner end of which is carried a cam member 21 designed to pass over and take the place of the cam 15. Arranged for longitudinal sliding movement in the extension is a rod 22 on the inner end of which is carried a pin 23 projecting upwardly in a diagonal slot 24 on the under side of the bar 20. When the cam 21 is brought over the cam 15 the gripper releases the end of the fabric at a point in advance of the place at which the cam 15 operates. By reciprocating the bar 22, the cam 21 may be made to take its place over the cam 15 at every other stroke of the knife, thus cutting wide and narrow strips in alternation.

The mechanism for reciprocating the bar 22 will now be described. It comprises a lever 25 pivoted to the frame at 26 and carrying at its lower end a roller 27 riding over a cam 28 and held against it by a spring 29. The cam 28 is carried on a shaft 30 which is rotated by chain and sprocket connection 31 from the shaft 11, the connections being such that the cam will shift at every other stroke of the knife.

When it is desired to cut strips of alternating widths, the slide 14 is adjusted so that the cam 15 will operate upon the grippers for the longer cut and the shaft 11 is connected to the shaft 30. In making the first stroke, the cam 15 operates upon the grippers and then the rod 22 is shifted to bring the cam 21 in place to make the narrow cut. Should it be desired to cut strips of a single width, the connection between the shafts 11 and 30 is removed so that the latter shaft does not revolve. Either cam 15 or 21 may then be utilized to the exclusion of the other and strips of equal width will be cut.

Having described my invention, it is obvious that many different embodiments may be devised which would, nevertheless, fall within the scope of this invention. It is also possible to incorporate this invention with other types of cutters than that shown.

I claim:

1. In combination with a machine for cutting strips of fabric, a cutting element means for feeding the material past the cutting element, and mechanism operable to change the extent of feeding action after each operation of the cutting element.

2. In combination with a machine for cutting strips of fabric, a knife, means for operating the knife to cut the fabric, means for drawing the fabric under the knife, a stop mechanism for limiting the action of the drawing means, and an auxiliary stop mechanism for replacing the primary stop mechanism between operations of the knife.

3. In a machine for cutting strips of fabric, a reciprocating knife, gripper mechanism for drawing the fabric past the knife, means for releasing the gripper at a predetermined point, and a device for shifting the location of the gripper releasing mechanism.

4. In a machine for cutting strips of fabric, a reciprocating knife, reciprocating gripper mechanism for drawing the fabric under the knife, a stop for releasing the gripper at one point, a second stop for releasing the gripper at another point, and means for selectively bringing the stops into operative relation to the grippers.

5. In a machine for cutting strips of fabric, a knife, means for advancing the fabric across the knife the distance required for a single cut, means for determining the length of said feed, and a device for changing the length of feed after each operation of the knife.

6. In a machine for cutting strips of fabric, a knife, means for advancing the fabric across the knife the distance required for a single cut, two stop mechanisms for determining the amount of advance of the advancing mechanism, and a device for bringing said stop mechanisms into operative position alternately.

7. In a machine for cutting strips of fabric, a knife, reciprocating gripper mechanism for drawing the fabric under the knife, two stop mechanisms for opening said grippers at different points to vary the feed of fabric, and a device to shift the stop mechanisms into and out of operative position with respect to said gripper mechanisms.

8. In a machine for cutting strips of fabric, a knife, reciprocating gripper mechanism for drawing the fabric under the knife, a relatively stationary stop mechanism for opening said gripper, a shiftable stop mechanism movable between the stationary stop mechanism and the knife.

9. In a machine for cutting strips of fabric, a knife, reciprocating gripper mechanism for drawing the fabric under the knife, a relatively stationary stop mechanism for opening said gripper, a shiftable stop mechanism movable between the stationary stop mechanism and the knife, and means to move said shiftable stop between alternate operations of the knife.

10. In a machine of the character described, a frame work, a table over which fabric is adapted to be moved, a reciprocating knife at the end of said table, reciprocating gripper mechanism to draw the fabric over the table, a stop mechanism to release the gripper mechanism at a predetermined point, a laterally movable stop mechanism shiftable in front of said first mentioned stop mechanism, and shifting mechanism controlled in coordination with the knife to move said shiftable stop.

11. In a machine for cutting fabric into strips, an intermittently actuated knife, means for operating the knife, and means for variably feeding the fabric during the idle periods of the knife whereby it is cut into groups of strips of different widths.

12. In a machine for cutting fabric into strips, an intermittently actuated knife, means for operating the knife, and means for feeding the leading end of the fabric past said knife for alternately varying distances, the feeding operation taking place during the inactive periods of the knife.

13. A machine for cutting fabric into strips of several widths, comprising a reciprocating knife, means for actuating the knife intermittently, and means for feeding the end of the fabric past the knife during the inactive periods thereof, said feeding means being operated to advance the fabric differing distances so as to make an equal number of cuts of the several widths.

14. Fabric cutting mechanism comprising in combination a cutting element, fabric feeding means adapted to advance the fabric past the cutting element, and a plurality of cam members adapted to successively cooperate with the feeding means to vary the feed of the fabric.

15. In a machine for cutting fabric on the bias the combination with an intermittently operated cutting element, of means acting within the inactive periods of the knife adapted to feed the fabric past the cutting element, and devices adapted to successively cooperate with the feeding means to vary the feed of the fabric.

16. In a machine for cutting a strip of material on the bias, the combination with a cutting element of reciprocable means adapted to feed the strip past the cutting element, and devices adapted to successively vary the stroke of said means.

17. Fabric cutting mechanism comprising in combination, a cutting element, fabric feeding means adapted to advance the fabric past the element, and a plurality of cam members adapted to successively cooperate with the feeding means to vary the feed of the fabric, one of said members being mounted upon the other for reciprocation laterally thereof.

EDWARD J. VAN AMBURGH.